Jan. 23, 1968  H. A. BAKKE ET AL  3,365,142
PAPER TENSION REGULATOR FOR STRIP CHART RECORDER
Filed May 27, 1966

INVENTORS.
HANS A. BAKKE
ROBERT E. DeMARCO
RALPH M. MANNING

Richard E. Hosley
ATTORNEY

United States Patent Office 3,365,142
Patented Jan. 23, 1968

3,365,142
PAPER TENSION REGULATOR FOR
STRIP CHART RECORDER
Hans A. Bakke, Swampscott, Robert E. De Marco, Peabody, and Ralph M. Manning, Winchester, Mass., assignors to General Electric Company, a corporation of New York
Filed May 27, 1966, Ser. No. 553,474
3 Claims. (Cl. 242—75.2)

ABSTRACT OF THE DISCLOSURE

A strip chart tension regulator. Paper from a supply roll is sandwiched between a pivoted bar and a frame member and then is returned to a reroll spool by being passed over a timing drum and the pivoted bar to provide a force across the timing drum opposing the rotation thereof for the entire chart length.

Background of the invention

This invention generally relates to strip chart recorders and more specifically to improved means for automatically regulating the tension of a strip chart as it passes through such a recorder.

In the design of strip chart recorders, the arrangement of the chart feeding components is of paramount importance to ensure that the chart flows smoothly through the recorder at a precisely controlled rate, for otherwise the records so produced would not be reliable as a correct representation of the changes in the condition being recorded as such changes are related to the changes in time or other parameter against which they are recorded. Such chart feeding components normally include the strip chart itself which initially is formed into a supply roll, suitable means for rotatably mounting the supply roll so that the strip chart can be easily taken from the roll and fed through the remainder of the recorder, a time control chart advancing mechanism usually in the form of a timing drum for positively driving the strip chart through the recorder at the controlled rate, and a reroll mechanism usually in the form of a suitably driven, rotatably mounted spool upon which the strip chart can be wound upon completion of its travel through the recorder. In addition, such components usually embody suitable means for imposing a drag force on the supply roll so that suitable tension is maintained on the strip chart between the supply roll and the timing drum, and the reroll mechanism. The torque furnished for winding the chart on the spool also maintains the chart under tension as it travels through the recorder subsequent to its engagement with the timing drum.

In order for the timing drum to positively and accurately advance the chart at a controlled rate, the forces imposed on the chart and the supply roll and at the reroll spool must be correlated to each other and to the force imposed on the chart by the timing drum. If these forces are not correlated, a smooth and controlled flow of the chart through the recorder will be difficult to attain and may result in such deleterious effects as slippage or possible tearing of the strip chart.

Therefore, it is an object of this invention to provide a single element in a strip chart recorder which automatically regulates the tension of the strip chart as it passes through the recorder regardless of the supply roll size.

It is another object of this invention to provide a tension regulating device in a strip chart recorder that responds directly to the tension in the chart and operates directly to regulate the relative forces applied to the chart as it passes to the timing drum and passes from the timing drum.

It is still another object of this invention to provide a simple and inexpensive direct acting means for automatically regulating the tension of the strip chart in a recording mechanism.

Summary

The above and further objects and advantages are obtained by using a tension regulator which is rotatably mounted from the main frame of the recorder. Tension regulation is obtained by threading the strip chart from the supply spool to the timing drum between a portion of the main frame and the regulator. The strip chart is passed over the tension regulator as it is threaded from the timing drum to the reroll spool. Tension in the strip chart is transferred to the regulator to cause the regulator to bear against the strip chart as it leaves the supply spool to thereby cause a varying drag force to be exerted on the strip chart.

This invention has been specifically pointed out in the appended claims. The above and further objects of the invention together with advantages and benefits attended thereto, will be more fully understood upon reference to the detailed description of the invention set forth below, particularly when taken in conjunction with the drawings annexed hereto.

Description of the preferred embodiment

Figure 1:
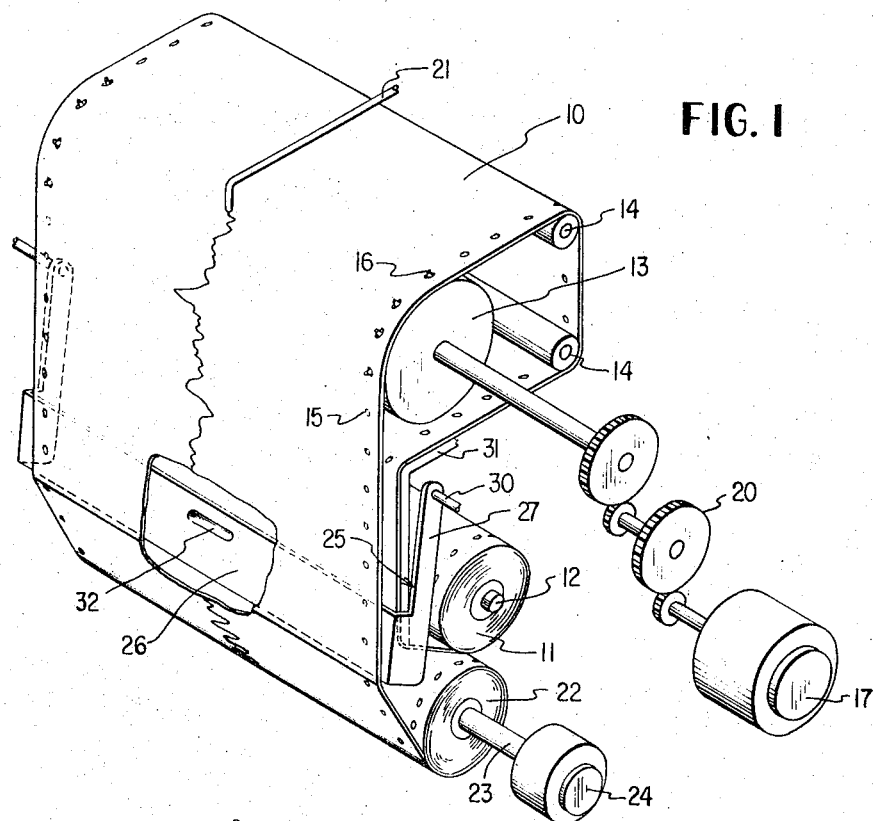
FIGURE 1 is a perspective view of a more or less schematic drawing of the chart feeding components normally utilized in a strip chart recorder including the novel tension regulating device forming the subject invention.

Referring now to the drawings, it is seen that FIGURE 1 discloses a conventional overall arrangement of chart feeding components normally found in a strip chart recorder comprising a strip chart 10 made from suitable recording paper and initially formed into a chart supply roll 11 suitably mounted on a shaft 12 which may be rotatable mounted on a main frame (which has not been shown for purposes of clarity). The strip chart 10 is drawn from the chart supply roll 11 and advanced through the recorder by means of a timing drum 13 there being a plurality of guide means 14 suitably mounted on the main frame to serve as a chart guide as the strip chart 10 passes from the chart supply roll 11 onto the timing drum 13. It is noted that the strip 10 has a plurality of perforations 15 arranged along its outer edges and these perforations cooperate in a known manner with a series of sprocket-like projections 16 circumferentially arranged around the outer ends of the timing drum 13 to permit the strip chart 10 to be advanced through the recorder. As indicated in the drawing, the timing drum 13 is rotatably mounted and is driven by a suitable clock mechanism which in the form shown in the drawings comprises a suitable constant speed electric motor 17 coupled to the timing drum 13 by means of a suitable gear train 20. The motor 17 turns the timing drum 13 at a controlled rate so that the strip chart 10 travels through the recorder at the controlled rate. The rate can be changed as desired in a known manner simply by rearranging the gears forming a part of the gear train 20. A suitable recording pen 21 is shown for cooperating with the strip chart 10 in a known manner to produce a record thereon of the particular condition being measured.

After leaving the timing drum 13, the strip chart 10 passes downwardly in a generally vertical direction across a writing table (not shown for purposes of clarity) which is also attached to the main frame. The direction of movement of the strip chart 10 is indicated by an arrow in FIGURE 2.

Located at the bottom of the main frame and toward the front thereof is a reroll spool 22 of conventional design including a centrally disposed shaft 23 which is rotatably mounted on the main frame and upon which the strip chart 10 is wound. The shaft 23 has been shown as being directly coupled to an electric motor 24 for continuously furnishing torque thereto. It will be understood, of course, that any suitable means can be utilized to couple the reroll spool 22 to the motor, the arrangement shown in FIGURE 1 being solely for the purpose of illustration.

If the torque exerted by the motor 24 upon the shaft 23 is substantially constant, then the force applied to the chart 10 tending to remove it from the timing drum 13 decreases as the radius of the reroll spool 22 increases. If no drag force is applied to the chart supply roll 11, then the reroll spool 22 can begin to drive the timing drum 13 because the net force across the timing drum 13 tends to aid its rotation rather than oppose it. This causes a change in force direction across the timing drum 13 which can cause a take-up of backlash with a resultant jerky or irregular operation. If the timing drum 13 and its driving means are not overpowered by the force exerted by the reroll spool 22, the tension applied through the strip chart 10 may exceed a value which causes the strip chart 10 to tear. Any of these can result in the strip chart 10 going out of registration with clock time.

Similarly, if a large drag force is applied initially, then when the radius of the reroll spool 22 becomes large, the tension force exerted may become so small that the drag force causes the timing drum to slow down as a result of a high value of force applied to timing drum 13 tending to oppose its rotation.

Figure 2:
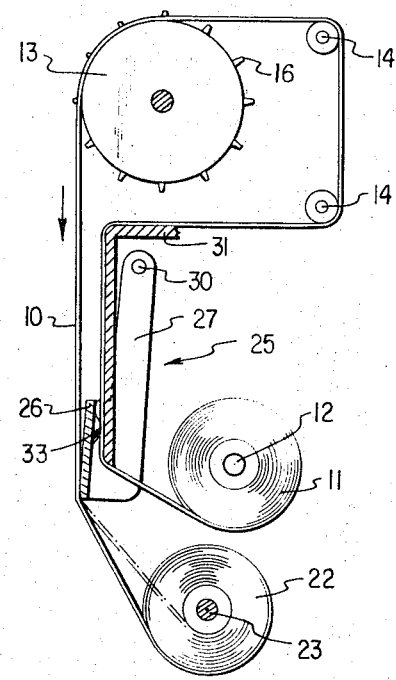
FIGURE 2 is an enlarged partial view of a portion of a commercial form of a strip chart recorder of the type shown in FIGURE 1, in which the novel tension regulating device shown in FIGURE 1 is shown in cooperative relationship with its associated parts.

In order to eliminate these undesirable features, a tension regulator generally designated by numeral 25 is utilized. The tension regulator generally includes a first portion which is constituted by a rigid, elongated metal bar 26 which extends transversely across the strip chart 10 whereby the strip chart 10 passes on both sides thereof. Integral L-shaped supporting portions 27 are formed at each end of the bar 26 perpendicular thereto for rotatably mounting the regulator 25 on pins 30 which are supported by the main frame. The regulator is thereby free to pivot, its motion being limited in one direction by a portion 31 of the main frame over which the chart 10 passes as it moves from the chart supply roll 11 to the timing drum 13. Also formed on one surface of the bar 26 is another portion of the tension regulator constituted by a smooth protuberance 33 on one side of the bar 26 as shown in FIGURE 2. This protuberance 33 can be formed by conventional metal stamping techniques whereupon a depression 32 shown in FIGURE 1 is formed on the reverse side of the bar 26.

As can be seen from FIGURES 1 and 2, the strip chart 10 is removed from the chart supply roll 11 and threaded between the elongated metal bar 26 and the main frame portion 31 and then over the guide means 14, the timing drum 13 and the bar 26 to the reroll spool 22 to be wound thereon. During initial periods of operation when the radius of the reroll spool 22 is small, the force in tension exerted by reroll spool 22 on the strip chart 10 is at a maximum and so, to maintain the net force opposing rotation of timing drum 13, the drag force should be at a maximum. As can be seen from FIGURE 2, the force exerted normal to the main frame portion 31 by the depression 32 is proportional to the angle subtended by the line of the strip chart 10 as it passes from elongated metal bar 26 to reroll spool 22 and the vertical. As this angle decreases with an increasing radius of the reroll spool 22, the normal force exerted against the main frame portion 31 and the strip chart 10 by the protuberance 33 on the tension regulator 25 decreases. Therefore, when the maximum force in tension is exerted on the strip chart 10 by the reroll spool 22, a maximum force is exerted by the regulator 25 as a frictional drag force.

As the radius of the reroll spool 22 increases, the angle subtended by the strip chart 10 and the vertical continues to decrease causing a further decrease in the force applied to the strip chart 10 as it passes from the chart supply spool 11 to the timing drum 13. Therefore, the force applied to the timing drum 13 by the strip chart 10 will, for a given recorder, tend to oppose motion of the timing drum 13 when a substantially long chart is utilized. This has several effects among which is the elimination of a force reversal which could cause backlash take-up with the resultant a jerky motion of the strip chart 10 over the writing table. Similarly, as the drag force is maximum when the force exerted by the reroll spool 22 is maximum and as the drag force is a minimum when the force exerted by the reroll spool 22 is a minimum, the range of forces to which the chart paper is subjected is also reduced.

Hence, an automatic tension regulator has been provided which is constructed as one integral member for controlling the force exerted on the strip chart 10 as it passes over the timing drum 13 in a strip chart recorder. The force across the timing drum 13 is maintained within a range of values which are constantly opposing rotation of the timing drum 13 to thereby provide a unidirectional load for the driving means connected to the timing drum 13. This provides a more accurate recorder by properly and predictably correlating the drive force at the chart supply roll 11 and the driving force at the timing drum 13.

The foregoing is a description of an illustrative embodiment of the invention, and it is the intention of the appended claims to cover all forms which fall within the scope of the invention.

What is claimed as new and desired to be secured by Letters Patent of the United States is:

1. In a strip chart recorder including a frame, a main chart in strip form, a supply spool mounted on the main frame upon which the strip chart is initially wound, means mounted on the main frame for advancing the strip chart through the recorder from the supply spool, a reroll spool mounted on the main frame for winding the strip chart thereon, and driving means for supplying continuous torque to the advancing means and the reroll spool, the improvement comprising:
    (a) a tension regulator including
        (i) a first portion over which the strip chart passes as it is wound on the reroll spool, said regulator tending to move in response to changes in tension of the strip, and
        (ii) a second portion adjacent a portion of the main frame engageable therewith, the strip chart passing between said second portion and the main frame as it is advanced from the supply spool to the advancing means, said second portion engaging the strip chart to regulate the tension thereof as it moves to the advancing means in response to pressure exerted on said first portion by the torque transmitted through the chart as it passes over said first portion to the reroll spool, and
    (b) means on the main frame rotatably mounting said tension regulator thereto.

2. A strip chart recorder as recited in claim 1 wherein said first portion extends transversely across the width of the strip chart and said second portion is constituted by a protuberance on said first portion which engages the strip chart.

3. A strip chart recorder as recited in claim 1 wherein said tension regulator includes a rigid bar member extending transversely to the chart, a pair of integrally formed supporting members and means on said supporting members for pivotally mounting said bar to the main frame and wherein said second portion includes a protuberance formed on said bar for engaging the chart and forcing it against the main frame as it moves from the supply roll to the advancing means.

References Cited
UNITED STATES PATENTS

| | | | |
|---|---|---|---|
| 1,783,008 | 11/1930 | Chidester | 242—75.2 |
| 1,965,567 | 7/1934 | Schwartz | 242—75.2 X |
| 2,937,820 | 5/1960 | Wilson | 242—75.43 |

FRANK J. COHEN, *Primary Examiner.*

N. L. MINTZ, *Assistant Examiner.*